Jan. 18, 1955 V. F. VOLK 2,699,897

COUNTING DEVICE

Filed Feb. 4, 1953

INVENTOR
Victor F. Volk
BY
Dean Fairbank & Hirsch
ATTORNEYS

United States Patent Office 2,699,897

Patented Jan. 18, 1955

2,699,897

COUNTING DEVICE

Victor F. Volk, Brooklyn, N. Y.

Application February 4, 1953, Serial No. 335,050

4 Claims. (Cl. 235—122)

This invention relates to counting devices which may be operated to bring successive numbers into view as particular events take place. Such devices may be used to ascertain the number of persons entering or leaving an enclosure; the number of vehicles passing a given point in a given time period, or the number of times any other event takes place, and in which the operator is interested.

The invention relates more particularly to counting devices of that type in which there are provided juxtaposed rotatable elements, each having thereon an annular row of digits in consecutive order, a casing having a window through which one digit of each row may be seen, means for effecting step by step rotation of one element to show successive digits, and means whereby an adjacent element is rotated one step to show the next digit only when the first element is being moved along the last step in a complete rotation, and to bring the digit 9 out of view and 0 into view.

The main object of the invention is to provide a device which is inexpensive, noiseless in operation, thin, flat, and light in weight, so that it may be readily carried in the pocket or held in the palm of the hand while being operated by one finger, and which has the numbers relatively large so that one digit in each row may be easily seen through a window in the casing.

As an important feature the device is formed of a plurality of thin, flat, relatively stiff superposed walls and interposed rotatable discs, the walls being secured against relative rotation to form a casing, and the discs each having an annular row of digits so that as each disc is rotated step by step, successive digits on that disc are brought into view at the window.

As a further feature each of the rotatable discs has an annular row of projections on its periphery, and which are exposed at an opening on the periphery of the casing, so that these projections may be engaged and the discs moved through successive tenths of a revolution, i. e., 36°, to bring successive digits into view.

As a further feature the upper of these rotatable discs within the casing has an annular row of windows registering with the annular row of digits on the rotatable disc therebeneath, and the casing has a window through which may be seen one digit on the upper rotatable disc.

As a further feature the projections on the periphery of one of the discs are relatively inaccessible, except when the numeral 9 on the other rotatable disc is exposed to view, and at which time both discs may be turned simultaneously through one tenth of a revolution, for instance to move the number 19 out of view and the number 20 into view.

One embodiment of the invention is illustrated in the accompanying drawings, but other embodiments may be employed. In the drawing.

Figures 1, 2, 3, 4, 5, 6, 7:
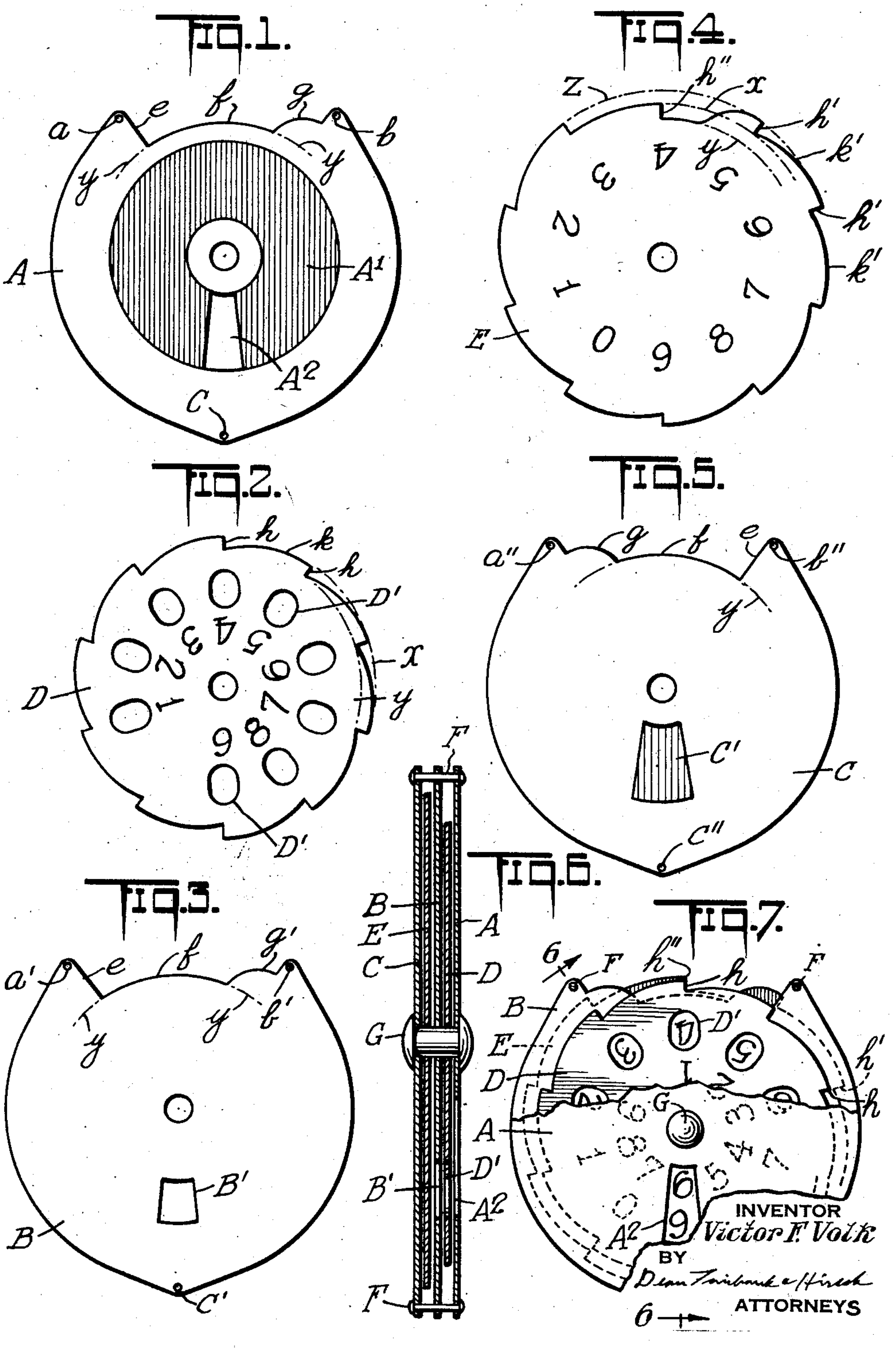
Fig. 1 is a face view of the front wall of the casing.
Fig. 2 is a face view of the upper rotatable disc which is beneath the front wall.
Fig. 3 is a face view of the non-rotatable partition within the casing.
Fig. 4 is a face view of the lower rotatable disc, which is disposed between the partition and the back wall.
Fig. 5 is a face view of the back wall of the casing.
Fig. 6 is a section in a plane including the axis, and with the thickness of the parts exaggerated.
Fig. 7 is a face view of the complete device, certain portions being broken away.

In the form illustrated the casing comprises the three walls A, B and C shown in Figs. 1, 3 and 5 respectively, and which are spaced apart to form two separate thin compartments in which are mounted the rotatable discs D and E shown in Figs. 2 and 4.

The three walls may be secured together in any suitable way along a major portion of the periphery, or only at a plurality of points beyond the peripheries of the rotatable discs. As shown, each of the walls has three small openings *a*, *b* and *c*, at spaced points adjacent the periphery, and these receive rivets F or other suitable fastening devices which hold the three walls against relative rotation and prevent separation. Each wall has a center hole for a pin, rivet or bolt G on which the discs rotate.

The walls of the casing may be of transparent or opaque material, but if transparent, certain portions are rendered opaque to conceal all but one digit of each row, and which digits appear in succession at a relatively narrow window or opening $A^2$ in the front wall A as the discs are rotated.

The front wall A of the casing, as shown in Fig. 1, has on one surface a ring shaped layer A′ of opaque material, which may be paint or paper, to conceal the parts therebeneath except at a radially extending window or transparent portion $A^2$ forming a gap in said opaque layer.

The partition B shown in Fig. 3 is of the same size and shape as the front wall, and has a window B′ which registers with only the radially outer part of the window $A^2$ of the front wall. The back wall C shown in Fig. 5 is also of the same size and shape, and may have an opaque or light reflecting portion C′ registering with the windows $A^2$ and B′, and preferably somewhat wider than those windows.

To facilitate rotation of the discs each of the casing walls A and C and the partition B has a gap or opening along a portion of the periphery, preferably diametrically opposite to the windows $A^2$ and B′ and the opaque part C′, and whereby access may be had to the periphery of each of the discs, and whereby each disc may be rotated step by step, each step being one-tenth of the circumference, or 36°.

Each such gap in the casing walls has a radially extending end portion *e*, an inner edge *f* concentric with the periphery of the casing and extending along about 60° and in an arc of a circle *y* hereinafter referred to, and an end portion *g* preferably convexly curved away from the inner edge *f* and extending to the periphery. This curved portion *g* on one of the walls is at the opposite end of the edge *f* from those on the other walls, so that the effective length of the gap at its inner edge will be one-tenth of the circumference, or 36°. By moving a finger in along the edge *g* on the wall A and counterclockwise along the edges *f* of all three walls, and out along the other edge *g* on the wall C, one may rotate the discs step by step.

In the casing and directly beneath the front wall A is the disc D shown in Fig. 2, and which has ten equally spaced projections and notches around its periphery. Each projection has a radially extending edge portion *h* and an edge portion *k* extending to the periphery, and curved in an arc eccentric with respect to the disc, and along 36°. Thus the edges *h* constitute radial shoulders which may be engaged to rotate the disc through successive steps.

To facilitate a clear understanding of the relative sizes of certain parts of the discs D and E on Figs. 2 and 4 I have shown arcs *x*, *y* and *z* of three concentric circles. On the disc D each radial edge *h* has its outer end terminating in the circle *x* and its inner end terminating in the circle *y*, and this disc has an annular row of nine digits 1 to 9 equally spaced except for a double width space between the numerals 9 and 1. It also has an annular row of holes or transparent portions D′ serving as windows, and each adjacent to and spaced radially outward from a corresponding one of the row of digits. These holes register with the radially inner part of the window $A^2$ and serve as windows through which may be seen the successive digits on the larger disc E therebeneath as said disc is rotated.

Beneath the partition B there is mounted the other rotatable disc E shown in Fig. 4. This is slightly larger in diameter than the disc D, and has an annular row of ten digits 0 to 9 which are at a radial distance from the center corresponding to that of the row of windows D′ in the disc D and the window B′ in the wall B. It also has ten projections with intermediate gaps on its periphery, and of the same general shape as those on the disc D, but one projection does not extend out radially as far as do the others, and one gap is deeper than the others. Nine of the projections each has a radial edge $h'$ and an eccentrically curved edge $k'$ the same as the edges $h$ and $k$ on the disc D, but spaced outwardly therefrom, and the other projection has a radial edge $h''$ which may register with each of the edges $h$ of disc D as the disc is rotated counterclockwise. Thus access to the disc D can be had only when the edge $h''$ on disc E is at the gap in the periphery of the casing. If the gap in the periphery of the casing is diametrically opposite to the window $A^2$, as in the form shown, this shorter projection is at the numeral 4 and diametrically opposite to the number 9, and the deeper notch is between the numerals 4 and 5, and opposite to the space between 9 and 0.

In Fig. 4 there are shown arcs $x$, $y$ and $z$ of circles concentric with the axis G, and of these $x$ and $y$ are of the same radii as $x$ and $y$ in Fig. 2. The arc $x$ is in a circle including the innermost portions of all but one of the gaps in the periphery of the disc E and the outer ends of all of the projections on the disc D. The arc $y$ has the same radius as the inner portion of one only of the gaps on the disc E, and all of the gaps on the disc D and the edge $f$ of the casing, and the arc $z$ is in a circle including the outer ends of all but one of the projections on the disc E, and is beyond the outer ends of all of the projections on the disc D.

Thus it will be seen that with the two discs D and E superposed and concentric, no access can be had to the disc D except at the gap between the numerals 4 and 5 on the disc E, and these are diametrically opposite to the numerals 9 and 0 respectively.

Thus, when the numeral 9 on disc E and any one of the numerals on the disc D are at the registering windows, one may insert a finger between the numerals 4 and 5 on the disc E, and in doing so will also insert the finger into the gap between two of the numerals on disc D and move both of the discs counterclockwise through 36°. Thus the numeral 9 on disc E will be replaced at the window B′ by a zero, and whatever numeral on disc D appears at the radially inward part of the window $A^2$ will be replaced by the next higher numeral. For instance, 69 at the window $A^2$ will be replaced by 70, as shown in Fig. 7. This rotation carries the deeper gap on the disc E away from the gap in the casing and no longer accessible until the disc E has rotated nine steps and through 324°, and then both discs are rotated to change the figure at the window from 79 to 80.

In many cases it is desired to count from a given number down to zero. For instance, when only forty people may be admitted the device may be set to show that number at the window, and as each person is admitted the device is operated to reduce the number by one, and to show how many more may be admitted. When zero is reached the door is closed. In such a device, if the discs are rotated counterclockwise as in the form shown, the sequence of digits will be counterclockwise instead of clockwise, and there will be an additional window in disc D between 1 and 9, and this will be marked 0.

Having thus described my invention what I claim as new and desire to secure by Letters Patent is:

1. A counting device formed of thin, stiff sheet material, and including a casing having front and back walls and an intermediate partition, the front wall and the partition having registering windows, a pair of rotatable discs in said casing and on opposite sides of said partition, and each having an annular row of digits, one row being of larger diameter than the other row and the upper disc having an annular row of openings registering with the row of digits on the disc therebeneath, means permitting step by step rotation of one disc to bring successive digits into registry with the window in the casing, and means permitting rotation of the other disc only when the numeral 9 of the first mentioned disc registers with the window in the casing.

2. A counting device having a casing formed of three thin sheets secured against relative rotation, the upper of said sheets having a window, and a pair of rotatable discs in said casing, one on each side of the intermediate sheet, each of said discs having an annular row of digits, one row being of larger diameter than the other and the upper of said discs having a row of windows registering with the row of digits on the under disc, means for facilitating the step by step rotation of one disc to bring its digits into registry in succession with the casing window, and means for rotating the other disc one step during the final portion of the rotation of the other disc.

3. A counting device comprising a casing having in the face thereof a window, a first rotatable disc in said casing disposed adjacent the face of said casing, said first rotatable disc having thereon an annular row of digits from 1 to 9 inclusive and an annular row of nine windows disposed so that one window is directly above each of said digits, a second rotatable disc disposed adjacent and beneath the first-mentioned disc, said second rotatable disc having thereon an annular row of digits from 0 to 9 inclusive, all but one of said digits from 0 to 9 inclusive being positioned to register with the windows in the first-mentioned rotatable disc, means for facilitating the step-by-step rotation of the first-mentioned disc to bring its digits into registry in succession with the casing window, and means for rotating the second disc one step during the final portion of the rotation of the first-mentioned disc so that a digit thereon is brought into registry with the window in the first-mentioned disc, which window is in registry with the casing window.

4. A counting device as defined in claim 3, in which the first-mentioned disc has an annular row of projections on its periphery, each projection registering with a digit on the disc, the projections being separated by notches, a member separates the two discs, and the second-mentioned disc has an annular row of projections on its periphery, each projection registering with a digit on the disc, the projections being separated by notches one of which is deeper than all of the other notches, whereby when said deeper notch is accessible through an opening in the casing both of said discs may be rotated.

References Cited in the file of this patent

UNITED STATES PATENTS

| | | |
|---|---|---|
| 233,216 | Dimmick | Oct. 12, 1880 |
| 897,877 | Cole | Sept. 8, 1908 |
| 2,366,422 | Nelson | Jan. 2, 1945 |
| 2,465,258 | Nelson | Mar. 22, 1949 |
| 2,507,173 | Noyes | May 8, 1950 |